United States Patent
Mayfield et al.

(10) Patent No.: US 9,604,582 B2
(45) Date of Patent: Mar. 28, 2017

(54) STORAGE RACK FOR T-TOPS

(71) Applicants: Eugene Phillip Mayfield, Carthage, MO (US); Thomas Bryan Todd, Carthage, MO (US)

(72) Inventors: Eugene Phillip Mayfield, Carthage, MO (US); Thomas Bryan Todd, Carthage, MO (US)

(73) Assignee: Highly Driven Products LLC, Carthage, MO (US)

( * ) Notice: Subject to any disclaimer, the term of this patent is extended or adjusted under 35 U.S.C. 154(b) by 0 days.

(21) Appl. No.: 15/160,918

(22) Filed: May 20, 2016

(65) Prior Publication Data

US 2016/0362069 A1 Dec. 15, 2016

Related U.S. Application Data

(60) Provisional application No. 62/230,658, filed on Jun. 12, 2015.

(51) Int. Cl.
*B60R 11/06* (2006.01)
*B60J 7/10* (2006.01)
*B60R 11/00* (2006.01)

(52) U.S. Cl.
CPC .............. *B60R 11/06* (2013.01); *B60J 7/106* (2013.01); *B60R 2011/0036* (2013.01)

(58) Field of Classification Search
CPC . B60R 11/06; B60R 2011/0036; A47B 81/00; B60J 7/106
USPC ........ 211/13.1; 248/166, 172, 176.1
See application file for complete search history.

(56) References Cited

U.S. PATENT DOCUMENTS

| | | | | |
|---|---|---|---|---|
| 499,881 | A | * 6/1893 | Goldstein | ............. A47F 7/0028 211/170 |
| 2,039,927 | A | * 5/1936 | Poglein | ............... B65G 49/062 211/13.1 |
| 2,516,088 | A | * 7/1950 | Einhorn | .................. A47L 19/04 211/41.5 |
| 2,841,288 | A | * 7/1958 | Field | ....................... A47L 19/04 211/41.4 |
| 2,956,763 | A | * 10/1960 | D'Arca | .................. B65D 19/12 108/53.1 |
| 3,321,262 | A | * 5/1967 | Mogler | ............. G07D 11/0006 211/126.16 |
| 3,730,354 | A | * 5/1973 | Bronstein | ............ A47G 25/005 211/181.1 |
| 4,467,944 | A | | 8/1984 | Manko |
| 5,193,874 | A | | 3/1993 | German et al. |

(Continued)

*Primary Examiner* — Korie H Chan
(74) *Attorney, Agent, or Firm* — Martin & Associates, LLC; Bret J. Petersen

(57) ABSTRACT

A storage rack provides convenient and secure storage of vehicle roof panels or "T-tops". The storage rack can be used both in a rear compartment of the vehicle during travel or outside the vehicle such as in a garage. The storage rack has two sets of arms to store the T-tops at an angle in the rear compartment of the vehicle to give the driver full visibility out the rear window. The storage rack arms can be put into a flat stow position to reduce the space taken by the storage rack when not being used for storage of the T-tops. The storage rack may be secured to the vehicle to prevent movement during operation of the vehicle. A hook may be incorporated into the storage rack to secure a hatch or glove box lid in the open position.

19 Claims, 8 Drawing Sheets

(56) References Cited

U.S. PATENT DOCUMENTS

| | | | |
|---|---|---|---|
| 5,242,255 A * | 9/1993 | Gleffe | B65D 19/12 108/53.1 |
| 7,032,964 B2 | 4/2006 | Kirk | |
| 7,438,338 B1 | 10/2008 | Schumacher et al. | |
| 7,938,483 B2 * | 5/2011 | Reitzloff | B60J 7/061 296/219 |
| 2009/0096238 A1 | 4/2009 | Misch | |

* cited by examiner

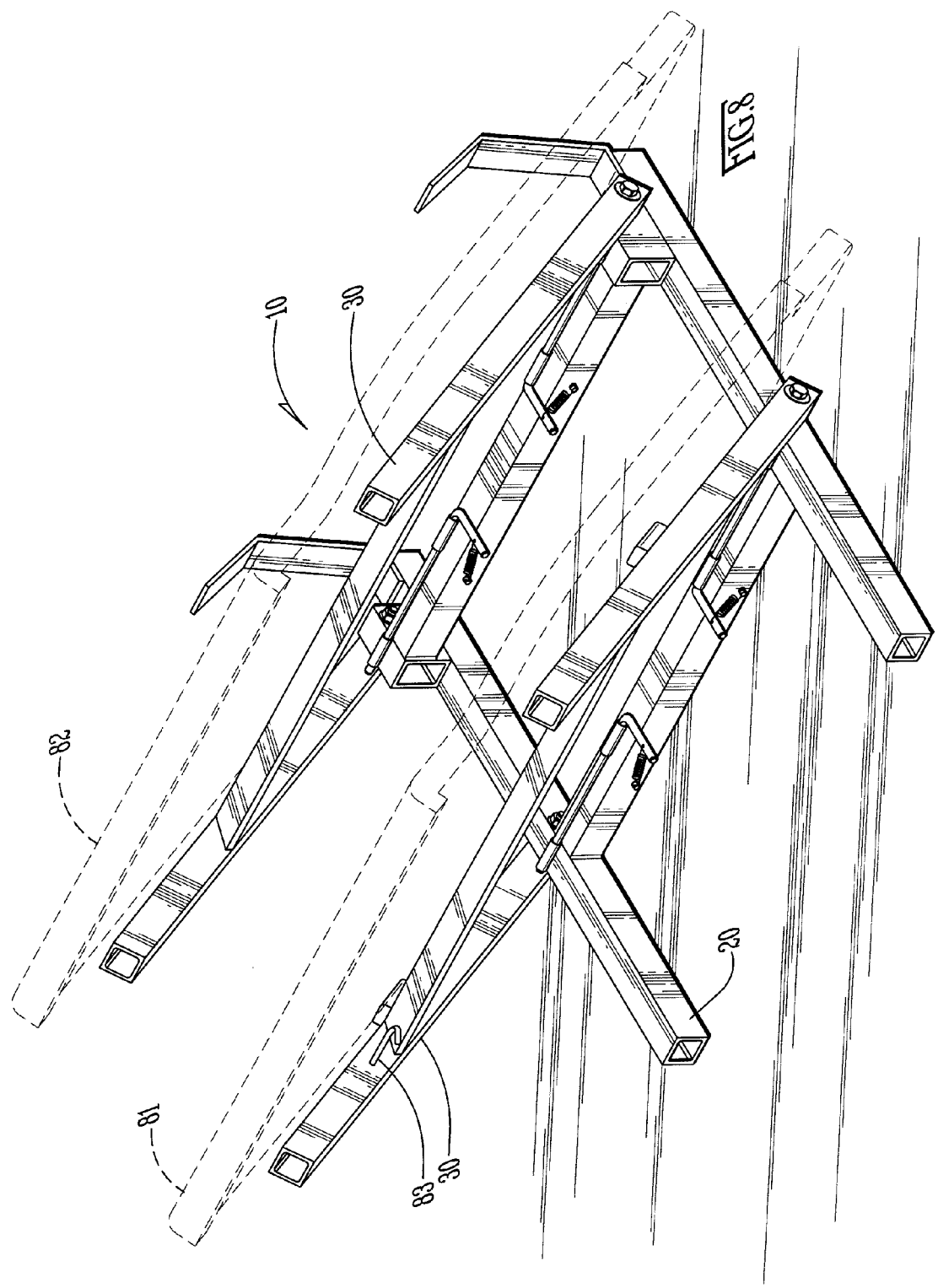

STORAGE RACK FOR T-TOPS

BACKGROUND

1. Technical Field

This disclosure generally relates to storage of sport utility vehicle roof panels or "T-tops", and more specifically relates to a rack for storing the T-tops in a rear compartment of the vehicle during travel and for storage outside the vehicle.

2. Background Art

The roof on some consumer motor vehicles, such as sport utility vehicles, have what is commonly referred to as a "T-top". The T-top gets its name from the "T" shaped roof of the vehicle. A vehicle with a T-top includes a central rail or bar, extending longitudinally with respect to the vehicle from a rear portion of the root to the area of the windshield. On either side of the bar, in areas above the doors and windows, are inserts which may be physically removed from the roof when desired. The inserts are commonly referred to as "T-tops". Removing the I-tops substantially opens up the roof (with the exception of the longitudinally extending central bar). The T-tops may be of metal like the remainder of the roof, or may consist of a metal frame and a transparent or translucent plastic panel.

When removed from the vehicle, the T-tops require care in handling and storage. A vehicle equipped with a T-top is typically provided with vinyl sleeves or bags, into which the T-top inserts are intended to be placed when removed from the roof. But insertion of the I-tops into the sleeves is difficult and does not fully protect them in the trunk or cargo area of the vehicle. Even if protected by sleeves, the inserts, are usually subject to shifting within the trunk or cargo area of the vehicle, and are prone to damage due to impact with each other and with the vehicle's structure due to the motion of the vehicle.

BRIEF SUMMARY

A storage rack provides convenient and secure storage of vehicle roof panels or "T-tops". The storage rack can be used both in a rear compartment of the vehicle during travel or outside the vehicle such as in a garage. The storage rack has two sets of arms to store two T-tops at an angle in the rear compartment of the vehicle to give the driver full visibility out the rear window. The storage rack arms can be put into a flat stow position to reduce the space taken by the storage rack when not being used for storage of the T-tops. The storage rack may be secured to the vehicle to prevent movement during operation of the vehicle. A hook may be incorporated into the storage rack to secure a hatch or glove box lid in the open position.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 8 illustrates a storage rack holding a set of T-tops from a sport utility vehicle.

DETAILED DESCRIPTION

The disclosure and claims herein relate to a storage rack that provides convenient and secure storage of vehicle roof panels or "T-tops". The storage rack can be used both in a rear compartment of the vehicle during travel or outside the vehicle such as in a garage. The storage rack has two sets of arms to store the T-tops at an angle in the rear compartment of the vehicle to give the driver full visibility out the rear window. The storage rack arms can be put into a flat stow position to reduce the space taken by the storage rack when not being used for storage of the T-tops. The storage rack may be secured to the vehicle to prevent movement during operation of the vehicle. A hook may be incorporated into the storage rack to secure a hatch or glove box lid in the open position.

Figure 1:
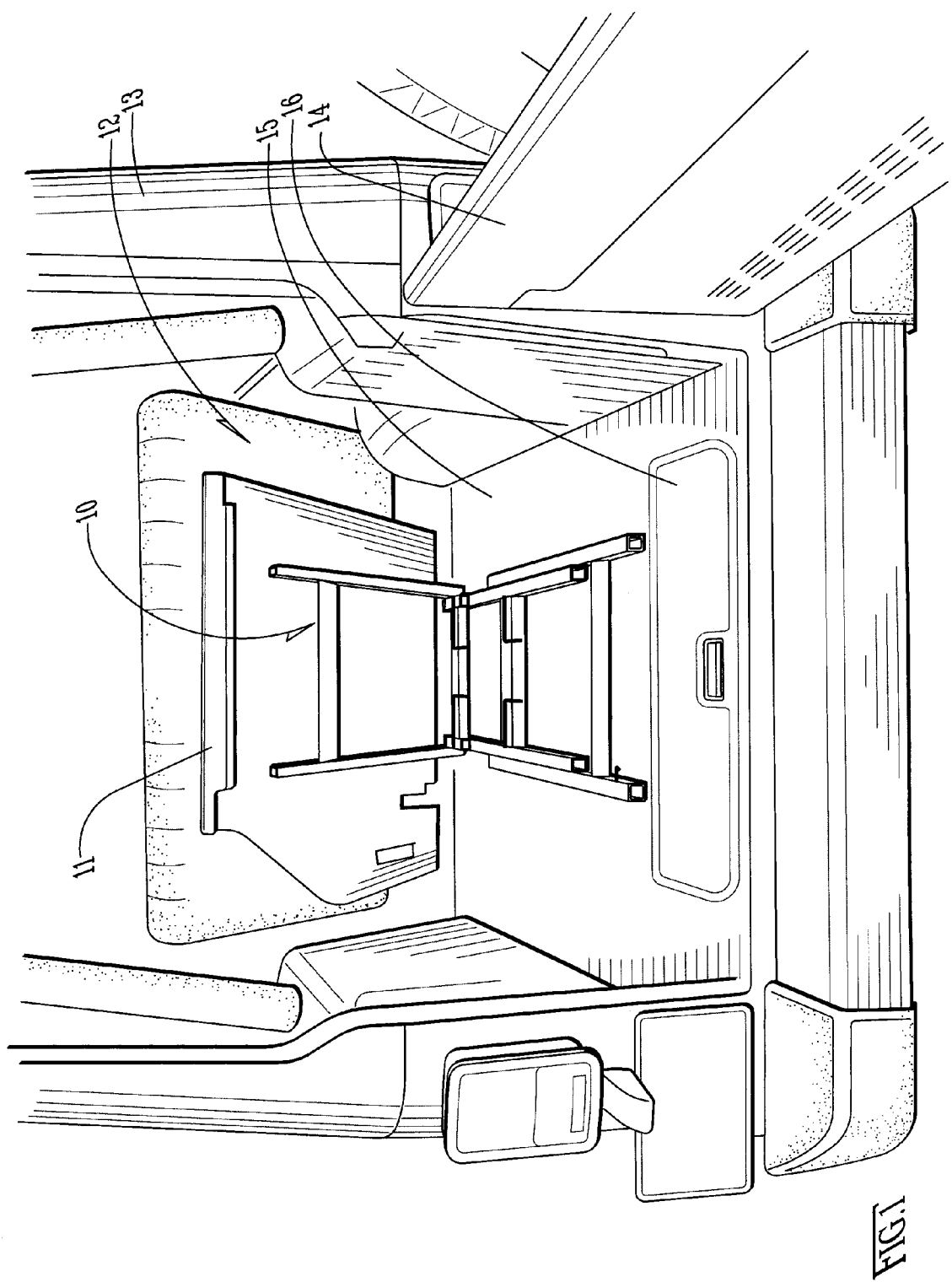
FIG. 1 illustrates a storage rack with one T-top in a cargo area of a sport utility vehicle.

FIG. 1 illustrates a storage rack 10 holding a T-top 11 in a cargo area 12 of a sport utility vehicle 13. As illustrated in FIG. 1, the sport utility vehicle 13 has a body style with a tail gate 14 that swings to one side. Other body styles include tailgates that swing down or a "hatchback" or "lift-back" design that swings up. The cargo area 12 of the sport utility vehicle 13 includes a floor or deck portion 15 and storage locker disposed beneath a hatch 16. The rack may be secured to the vehicle in an appropriate manner. For example, cargo tie down straps not shown in FIG. 1 may be used for anchoring the rack 10 to the floor or deck portion 15. A hook (shown in FIG. 3) may be used to hold the hatch 16 in an open position as discussed below.

Figure 2:
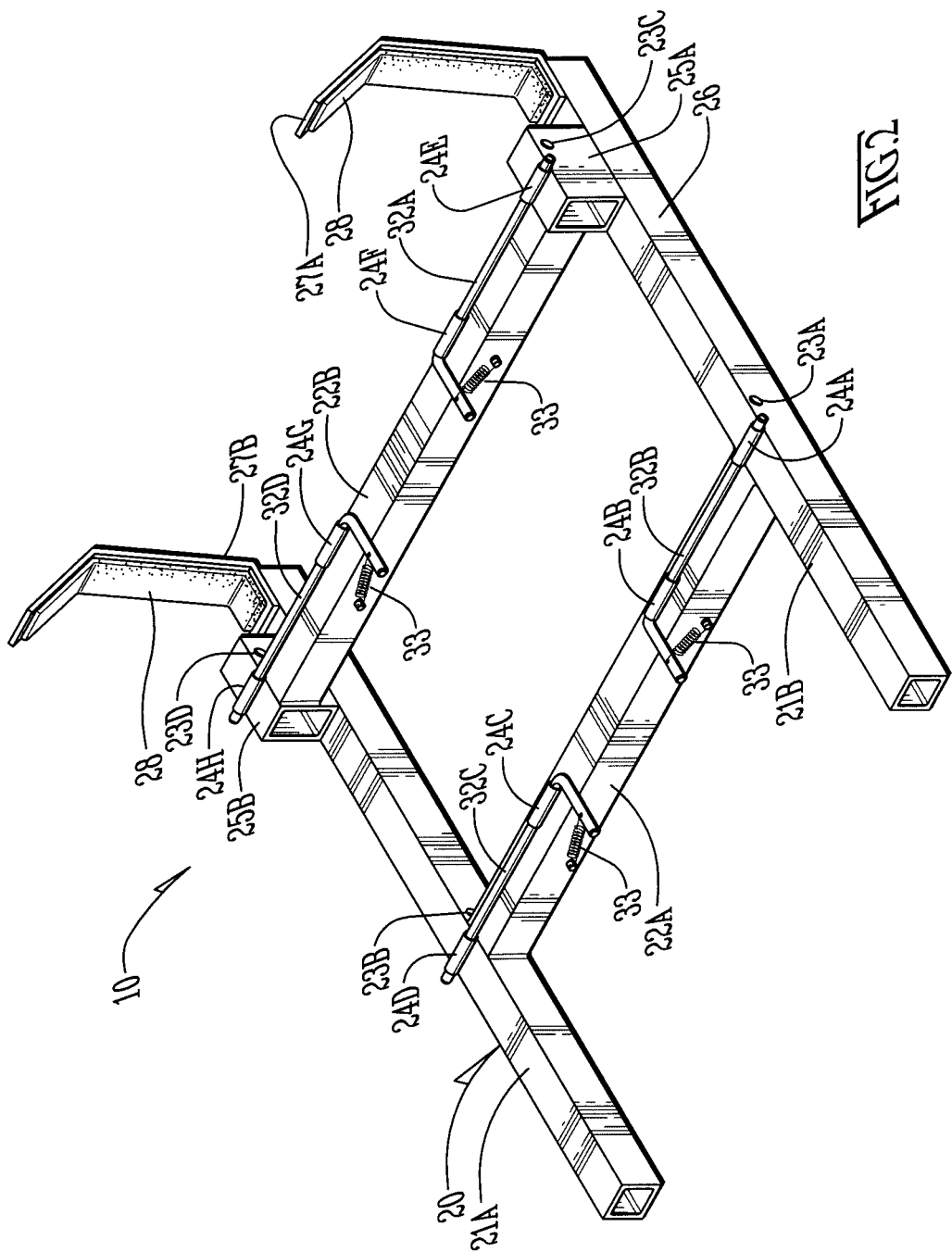
FIG. 2 illustrates a perspective view of a base of the storage rack.

FIG. 2 illustrates an example of a base 20 of the storage rack 10 shown in FIG. 1. In this example, the base 20 has a left side 21A and a right side 21B (collectively referred to as sides 21). The sides 21 are connected by a first cross member 22A and a second cross member 22B (collectively referred to as cross members 22). The cross members 22 are connected to the sides 21 to hold the sides 21 together and to form a solid base for the rack 10 to hold the T-tops (not shown). In this example, the first cross member is connected directly to the sides 21, and the second cross member is connected to a set of arm mounts 25A, 25B that are attached to the arms. The second cross member 22B is connected level to the arm mounts 25A, 25B to provide a surface for pin retainer sleeves and pins. The arm mounts, pin retainer sleeves and pins are described further below. The cross members 22 may be connected to the sides 21 in any suitable manner such as bolting or welding. In the illustrated example, the cross members 22 are welded to the sides 21 and arm mounts 25A, 25B to hold the sides parallel to one another. Other configurations of cross members could be used to hold the sides together. For example, a single cross member may be used or cross members could be connected at other angles to the sides 21.

Again referring to FIG. 2, the base 20 further includes mounting holes 23A-23D (collectively 23) and pin retainer sleeves 24A-24H (collectively 24). The mounting holes 23 provide a mounting point for the rack arms as shown in FIG.

Figure 3:
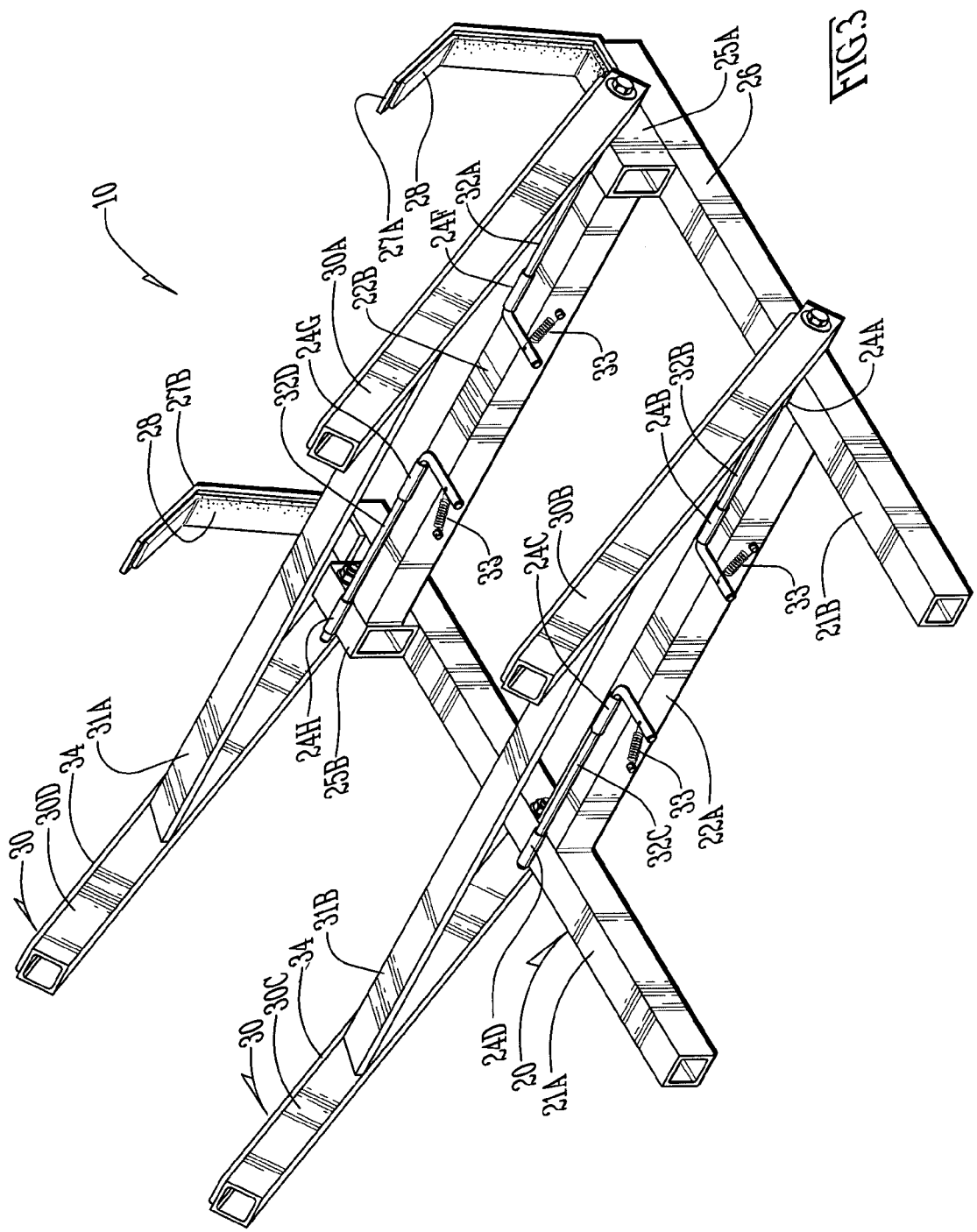
FIG. 3 illustrates a perspective view of a storage rack with arms connected to the base.
Figure 6:
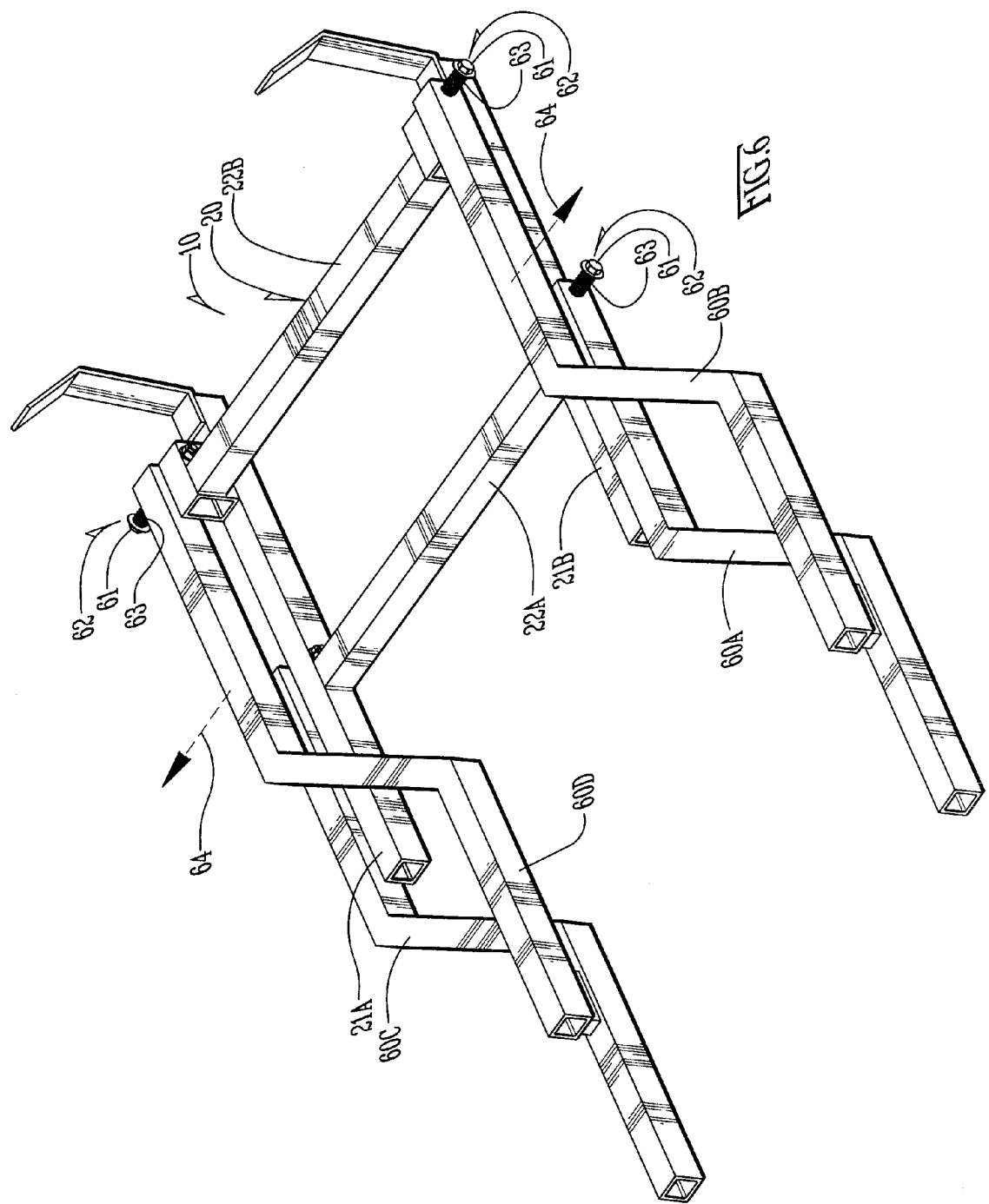
FIG. 6 illustrates an alternative configuration for the arms of the storage rack.

3. The pin retainer sleeves 24 provide captivation of retaining pins that hold the rack arms in a storage position as shown in FIG. 3. The base may include one or more arm mounts 25A, 25B (collectively 25). The arm mounts provide a mounting location for the outer arms as shown in FIG. 3. The arm mounts 25A, 25B include mounting holes 23C, 23D and pin retainer sleeves 24E, 24H respectively. In the illustrated example, the arm mounts 25 are located on the top surface of the sides 21. Alternatively, the arm mounts 25 could be located on the outside edge of the sides 21. For example, the arm mount 25A could be located on the outside edge 26 of side 21B. The base 20 further includes stops 27A, 27B (collectively 27). The stops 27 hold the back most T-top stored in the rack 20 as shown in FIG. 6 and described below. The stops 27 may include added padding 28 on the surface of the stops 27 where the T-top will come in contact with the stops 27 to prevent the rack from scratching the T-top.

FIG. 3 illustrates a perspective view of the storage rack 10 with arms 30A-30D (collectively 30) connected to the base 20. Each pair of arms may be connected together to provide rigidity. Thus the top right arm 30A is connected to the top left arm 30D with cross member 31A. Similarly, the bottom right arm 30B is connected to the bottom left arm 30C with cross member 31B. In the illustrated example, the cross members 31A, 31B are welded to the arms 30. Other means of attaching the arms and cross members could also be utilized. In the illustrated example, the cross members 31A, 31B comprise a plate attached at an angle with the arms. The angle of the cross member is made such that a face of the plate may readily display a company logo when the arms are in the stow position and can also be seen in the storage position. The storage rack 10 further includes retaining pins 32A-D that hold the arms in the storage position as shown in more detail in FIG. 5. The arms 30 may also include added padding 34 where the T-top will come in contact with the arms 30 to prevent the rack from scratching the T-top. In the illustrated example, the base 20 and the arms 30 are made of metal tube stock.

Figure 4:
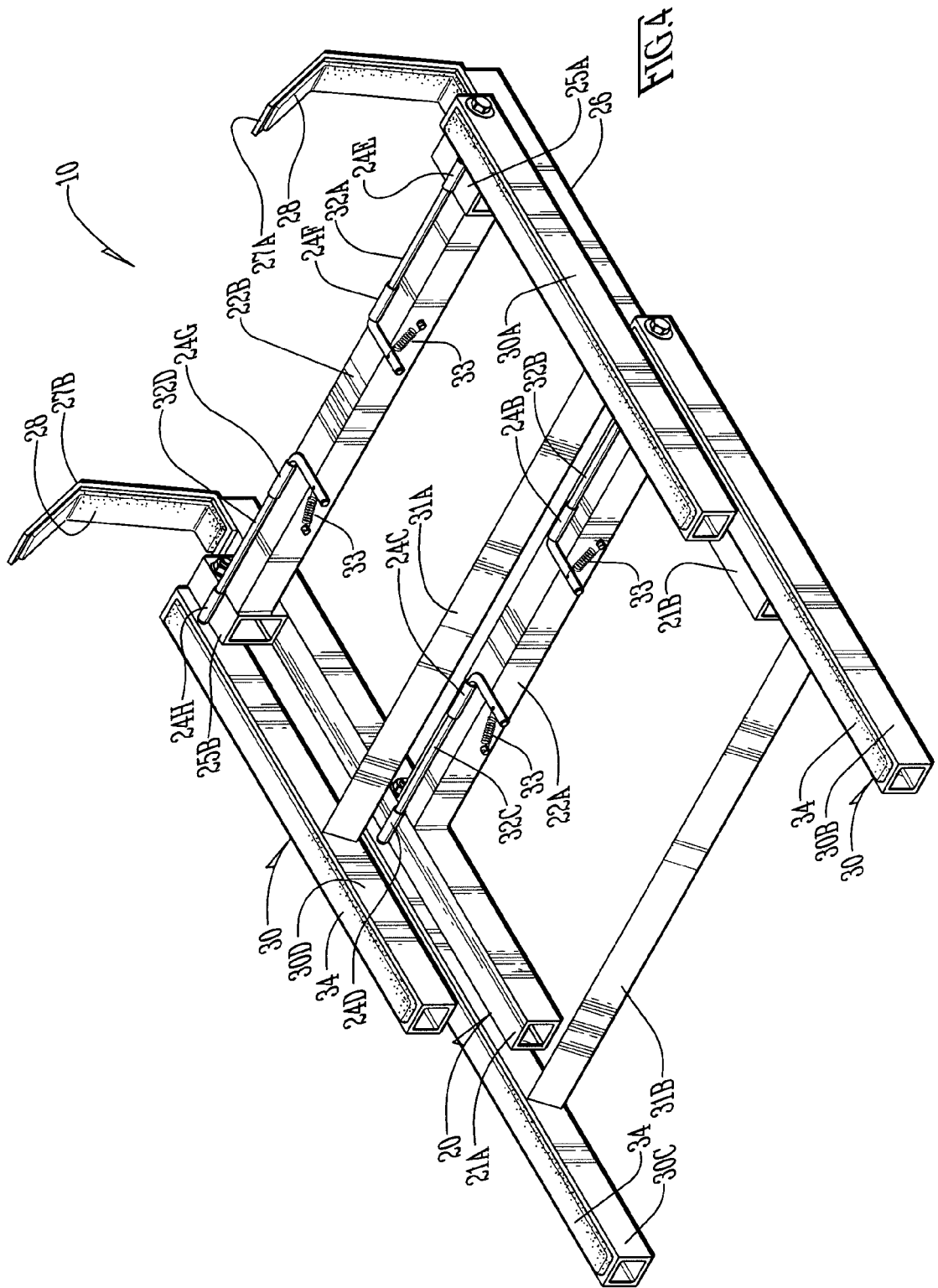
FIG. 4 illustrates a storage rack as shown in FIG. 3 with the storage arms in a stow position.

FIG. 4 illustrates a perspective view of storage rack 10 with the arms 30 in a stow position. In the stow position, the arms 30 lie flat and on top of the base 20. In the stow position, the area used by the storage rack 10 is minimized so the cargo area of the vehicle can be utilized for other items.

Figure 5:
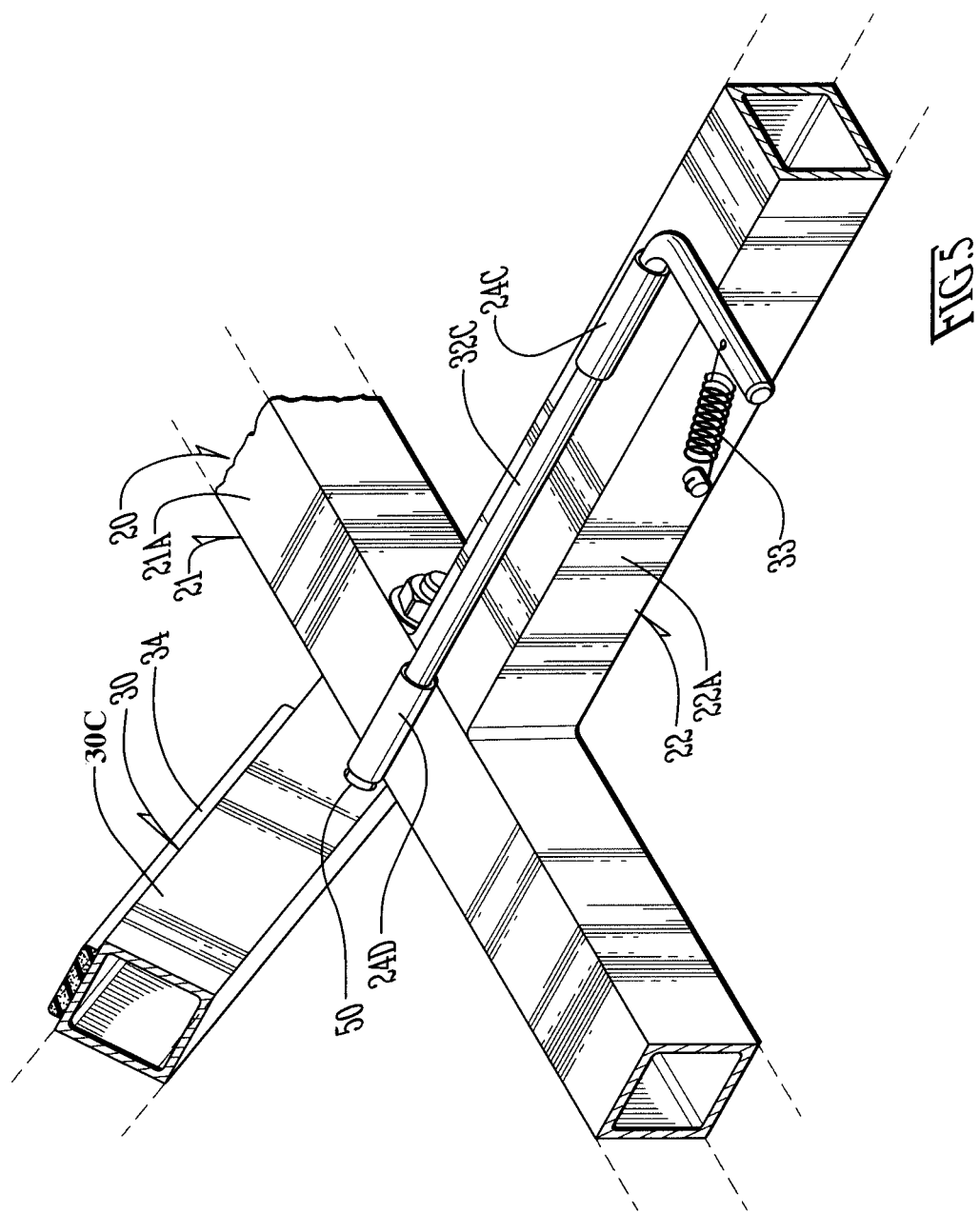
FIG. 5 illustrates an example of arm retainers for the storage rack.

FIG. 5 illustrates details of an example arm retainers for holding the arms 30 of the storage rack 10 in the storage position. FIG. 5 shows a close-up view of one retaining pin 32C securing an arm 30C in the storage position. The other arms are held in the storage position in a similar manner. In this example, the arm 30C is held in place by a retaining pin 32C that slides into and engages a hole 50 in the arm 30C. The retaining pin 32C is captivated by a first pin retainer sleeve 24D attached to the side 21A, and a second pin retainer sleeve 24C attached to cross member 22A. The retaining pin 32C slides from side to side under tension of a spring 33 and as captivated by the pin retainer sleeves 24C, 24D. The spring 33 is under tension with one end of the spring attached to the retainer pin 32C and the other end is secured to the cross member 22A. The user can pull on the pin 32C and pivot the arm 30C to adjust the arms 30 to the storage position. When the arm is pivoted to the storage position, the spring 33 pulls the retaining pin 32C into the hole 50.

FIG. 6 illustrates another example of arms for the storage rack 10. In this example, the arms 60A-D are not straight. Each of the arms has an offset to one side as shown. This illustrates that the arms can have multiple shapes within the scope of the claimed invention. Other arm shapes could be used to accommodate T-tops of various sizes and shapes. In addition, in this example the arms 60A-D are not connected with a cross member and can move independently of one another. The arms 60A-D pivot about a bolt 61 similar to the previous example so the arms 60 can be placed in a storage position. However, in this example, the arm retainer 62 includes a spring 63 is placed on the bolt next to the arm to allow the arm to move laterally as indicated by the arrows 64. The arm retainer 62 with the spring 63 is described further below with reference to FIG. 7.

Figure 7:
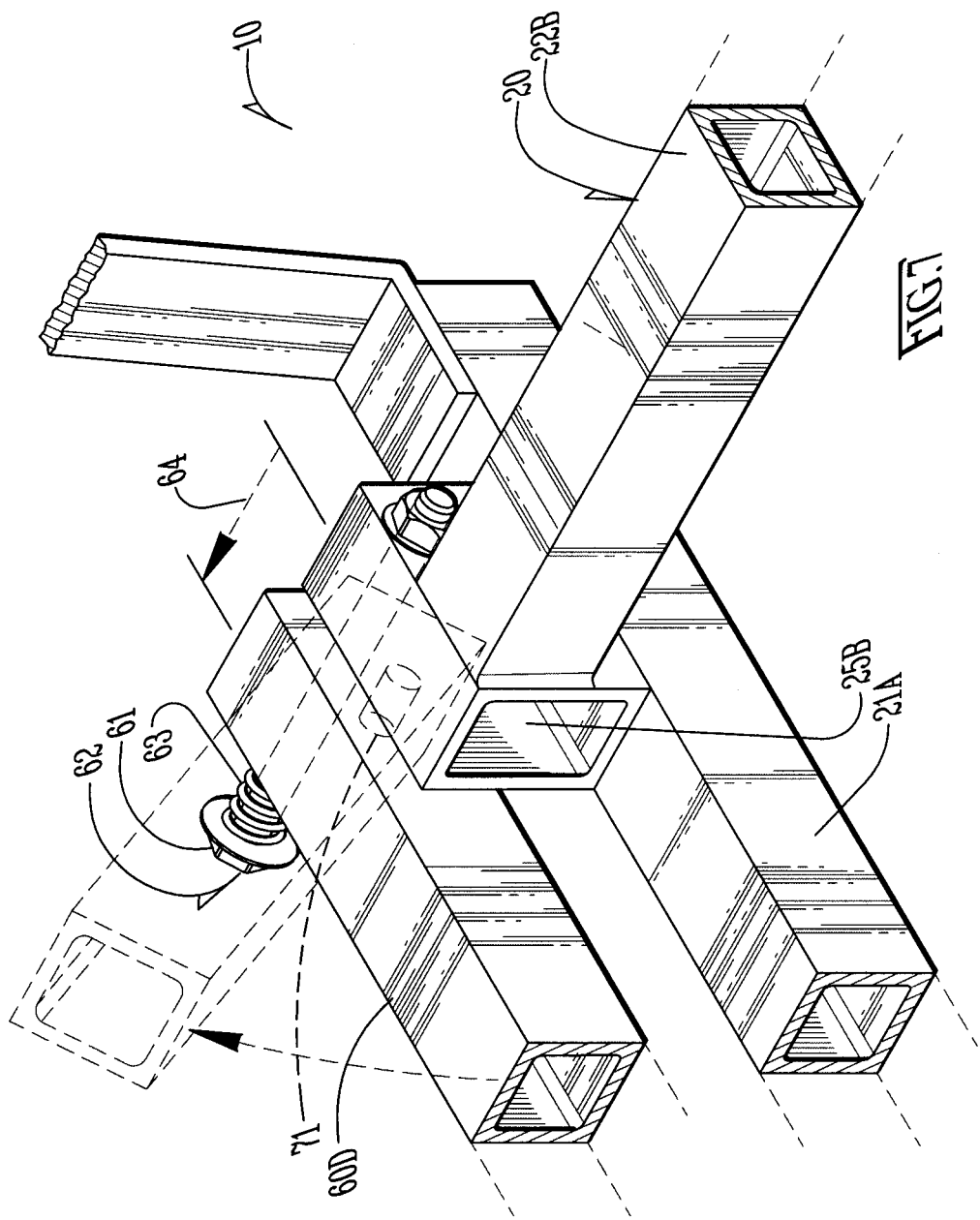
FIG. 7 illustrates a close up view of a retainer for the alternative configuration shown in FIG. 6.

FIG. 7 illustrates a close up view of the retainer 62 in the alternative configuration shown in FIG. 6. Each arm 60A-D (collectively 60) includes a retainer 62 as shown. As introduced above, the arm 60 is connected to the base 20 with a bolt 61. The bolt includes a spring 63 under compression between the bolt head and the arm 60. The spring 63 allows the arm 60 to move laterally as shown at 64. The base 20 includes a pin 71 fixed to the arm support 25B. The pin 71 extends beyond the surface of the arm support 25B and the base 20 towards the arm 60D. The arm 60D is held in the storage position by the pin engaging in a corresponding hole (not shown) in the arm 60D when the user moves the arm 60D laterally as shown at 64 and up to the storage position shown in phantom lines in FIG. 7.

FIG. 8 illustrates a storage rack 10 holding a set of T-tops of a sport utility vehicle. In this illustration, a first T-top 81 is held in the storage position by a front set of arms 30. A second T-top 82 is held in the storage position by a rear set of arms 30. The storage rack 10 holding the T-tops 81, 82 can be set on any surface for storing the T-tops. Thus the T-tops can be stored in the vehicle as shown in FIG. 1 or outside the vehicle such as in a garage or storage room. The front set of arms 30 includes a hook 83. The hook 83 can be used to hold the hatch 16 (FIG. 1) in an open position with a lanyard (not shown) attached to the hatch 16.

The disclosure and claims herein relate to a storage rack that provides convenient and secure storage of T-tops that can be used both in a rear compartment of the vehicle during travel or outside the vehicle such as in a garage. The storage rack has two sets of arms to store the T-tops at an angle in the rear compartment of the vehicle to give the driver full visibility out the rear window and can be put into a flat stow position to reduce the space taken by the storage rack when not being used for storage of the T-tops.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A rack for storing roof panels of a vehicle comprising:
a base;
a plurality of arms pivotably connected to the base,
one or more panel stops fixedly attached to the base to hold a roof panel when a first set of arms is in a storage position;
wherein the arms pivot and lock into the storage position with an acute angle between each of the arms and the base and create two storage locations for storing the roof panels when in the storage position; and
the arms further pivot into a stow position parallel to the base.

2. The apparatus of claim 1 wherein the base comprises:
a first side and a second side connected by at least one cross member; and
a retainer for each of the plurality of arms.

3. The apparatus of claim 2 wherein the retainer comprises a pin attached to the base and a corresponding hole in the arms.

4. The apparatus of claim 3 wherein the pin moves within a pin retainer sleeve mounted to the base.

5. The apparatus of claim 2 wherein the retainer comprises a pin fixed to an arm support connected to the base and the arm is mounted to the base with a spring that allows the pin to contact a hole in the arm.

6. The apparatus of claim 1 wherein the plurality of arms comprise at least two sets of two arms pivotably connected to the base.

7. The apparatus of claim 1 wherein at least one arm further comprises a hook to secure a hatch door of the vehicle.

8. The apparatus of claim 1 wherein the base of the rack is secured to the vehicle.

9. The apparatus of claim 4 further comprising padding on the arms where the roof panels contact the arms.

10. The apparatus of claim 1 wherein the panel stops have padding where the roof panels contact the stops.

11. The apparatus of claim 1 wherein the base and the arms are formed from metal tubes.

12. A rack for storing roof panels of a vehicle comprising:
a base;
two sets of arms pivotably connected to the base,
wherein the two sets of arms pivot and lock into a storage position with an acute angle between each of the arms and the base and create two storage locations for storing the roof panels when in the storage position; and
the two sets of arms further pivot into a stow positon parallel to the base wherein the two sets of arms each comprise at least two arms pivotably connected to arm mounts on the base;
padding on the two sets of arms where the roof panels contact the two sets of arms;
one or more panel stops attached to the base to hold a roof panel when a first set of the two sets of arms is in the storage position with padding where the roof panels contact the panel stops; and
wherein the two sets of arms together create two storage locations for storing the roof panels when in the storage position.

13. The apparatus of claim 12 wherein the base comprises:
a first side and as second side connected by at least one cross member; and
a retainer for each of the two sets of arms.

14. The apparatus of claim 13 wherein the retainer comprises a pin attached to the base and a corresponding hole in the arms.

15. The apparatus of claim 14 wherein the pin moves within a pin retainer sleeve mounted to the base.

16. The apparatus of claim 13 wherein the retainer comprises a pin fixed to an arm support connected to the base and the arm is mounted to the base with a spring that allows the pin to contact a hole in the arm.

17. The apparatus of claim 12 wherein at least one arm further comprises a hook to secure a hatch door of the vehicle.

18. A rack for storing roof panels of a vehicle comprising:
a base;
two sets of arms pivotably connected to the base,
wherein the two sets of arms pivot and lock into a storage position with an acute angle between each of the arms and the base and create two storage locations for storing the roof panels when in the storage position; and
the two sets of arms further pivot into a stow positon parallel to the base wherein the two sets of arms each comprise at least two arms pivotably connected to arm mounts on the base;
padding on the two sets of arms where the roof panels contact the two sets of arms;
a hook to secure a hatch door of the vehicle
one or more panel stops attached to the base to hold a roof panel when a first set of the two sets of arms is in the storage position with padding where the roof panels contact the panel stops;
wherein the two sets of arms together create two storage locations for storing the roof panels when in the storage position.

19. The apparatus of claim 18 further comprising a pin that moves within a pin retainer sleeve mounted to the base and the pin engages a corresponding hole in the arms.

* * * * *